United States Patent [19]  
Vossieck et al.

[11] Patent Number: 4,558,872  
[45] Date of Patent: Dec. 17, 1985

[54] SLIDE RING SEAL ASSEMBLY WITH NOVEL COMPRESSION SPRING

[75] Inventors: Paul Vossieck; Karl vom Stein, both of Burscheid, Fed. Rep. of Germany

[73] Assignee: Goetze AG, Burscheid, Fed. Rep. of Germany

[21] Appl. No.: 719,305

[22] Filed: Apr. 2, 1985

[30] Foreign Application Priority Data

Apr. 4, 1984 [DE] Fed. Rep. of Germany ....... 3412594

[51] Int. Cl.⁴ .............................................. F16J 15/36
[52] U.S. Cl. ....................................... 277/88; 277/42; 277/93 SD
[58] Field of Search ................... 277/38, 42, 43, 81 R, 277/86, 88–90, 93 R, 93 SD

[56] References Cited

U.S. PATENT DOCUMENTS 2,606,045 8/1952 Porges .......................... 277/93 R X

FOREIGN PATENT DOCUMENTS

| 188167 | 1/1957 | Austria ........................... 277/93 SD |
| 657657 | 2/1963 | Canada ........................... 277/93 SD |
| 687711 | 6/1964 | Canada ........................... 277/93 SD |
| 1858504 | 3/1969 | Fed. Rep. of Germany . |
| 1300747 | 8/1969 | Fed. Rep. of Germany ........ 277/42 |
| 1241626 | 8/1960 | France . |
| 561467 | 4/1957 | Italy ..................................... 277/43 |

Primary Examiner—Robert S. Ward  
Attorney, Agent, or Firm—Spencer & Frank

[57] ABSTRACT

A slide ring seal assembly for installation on a shaft includes an axially displaceable slide ring; an elastic collar arranged coaxially with the slide ring and being in engagement with the slide ring for providing a static seal between the slide ring and the shaft, and a helical compression spring having opposite first and second ends. The compression spring is arranged coaxially with the slide ring and the elastic collar and exerts a radial force on the shaft with at least one first spring turn. The second end is situated at the slide ring and is operatively connected therewith for axially urging the slide ring towards a counterring in the installed state of the assembly. At the second spring end at least one second turn surrounds the slide ring with a radial bias and further, the compression spring axially presses, with at least one third turn, the free end face of the slide ring with the intermediary of the elastic collar. Further, the compression spring, with at least one fourth turn in the zone of the static seal between the slide ring and the shaft, lies on the outer circumference on the elastic collar and presses the latter radially against the shaft.

6 Claims, 3 Drawing Figures

SLIDE RING SEAL ASSEMBLY WITH NOVEL COMPRESSION SPRING

BACKGROUND OF THE INVENTION

This invention relates to a slide ring seal assembly which may find particular use for sealing pump shafts and which is of the type that has an axially shiftable slide ring, an elastic collar surrounding the shaft and serving for statically sealing the slide ring with respect to the shaft and a compression spring which concentrically surrounds the shaft and which serves for axially pressing the slide ring against a counter ring. The compression spring is frictionally connected with the shaft by means of at least one spring wire turn at the end opposite from the slide ring.

A slide ring seal of the above-outlined type which is disclosed, for example, in French Pat. No. 1,241,626, has an axially shiftable and rotatable slide ring, an approximately conically wound compression spring surrounding the shaft and acting in the axial direction by pressing the slide ring axially against a counter ring. In the zone of the spring wire turns which have the smallest diameter, the compression spring is adapted to the diametral dimensions of the shaft and at that location the spring is frictionally connected with the shaft in a torque-transmitting manner and abuts a shaft collar for axial support. The static seal between the slide ring and the shaft to hermetically separate a pressure chamber from the environment is effected by an elastic ring which is received in a recess in the reverse side of the slide ring and which is tightened about the shaft. An additional cover disc on the free end faces of the slide ring constitutes a spring support for the spring for exerting pressure on the slide ring.

While slide ring seals of the above-outlined construction have been used for many years, their manufacture has still been expensive and complicated. Thus, the slide ring seal has been formed of at least four components which all have to be separately manufactured and assembled to a structural unit. The slide ring which preferably is made of a hard and wear-resistant sintered material may be sintered only if it is of relatively large volume so that the final contours and recesses have to be machined into the hard material by a subsequent operation.

In the slide ring seal disclosed in French Pat. No. 1,241,626 a transmission of the torque from the shaft to the slide ring is effected exclusively by the compression spring by providing that the latter is, on the one hand, attached by friction to the shaft and abuts a shaft collar and, on the other hand, is pressed with its end face against the free end face of the slide ring. Particularly in case of tolerance deviations in the finished spring and a weakening of the spring force after a long service period, an unsatisfactory torque transmission may occur—particularly in case of high loads on the slide ring seals—which manifests itself by a circumferential slippage of the spring with respect to the slide ring seal components. This results in friction-caused wear of the spring and the ring components, and the entire seal may lose its sealing properties and has to be eventually replaced at significant expense.

SUMMARY OF THE INVENTION

It is an object of the invention to provide an improved slide ring seal of the above-outlined type in which, with simplified structural components, a better and operationally safer torque transmission may be effected in a simple and economical manner.

This object and others to become apparent as the specification progresses, are accomplished by the invention, according to which, briefly stated, one axial end of the compression spring surrounds, with at least one spring wire turn, the slide ring with a radial bias and further, the compression spring axially presses, with at least one turn, the free end face of the slide ring with the intermediary of the elastic collar. Further, the compression spring, with at least one further turn in the zone of the static seal between the slide ring and the shaft, lies on the outer circumference on the elastic collar and presses the latter radially against the shaft.

Thus, according to the invention, the torque is transmitted from the spring to the slide ring by the spring turn which axially presses against the free end face of the slide ring and by the spring turn connected with the outer circumferential surface of the slide ring so that by virtue of these two cooperating measures the slide ring and the spring are connected to one another in a manner which prevents a relative rotation between the spring and the slide ring more securely than it has been possible heretofore. The slide ring seal constructed according to the invention and particularly the elastic collar, is protected from damages and wear, even in case of extreme loads, and is operationally safer and thus has a longer service life than prior art constructions.

By virtue of the fact that at least one outer spring turn surrounds, with a radially inwardly directed bias, the circumferential face of the slide ring, the latter is stabilized in its position and is protected from an axial misalignment and wear, particularly at the sliding faces.

By virtue of the fact that the elastic collar is pressed, by means of a spring turn, onto the shaft for the static sealing of the slide ring, there is obtained an additionally improved torque transmission from the location of contact with the elastic collar to the slide ring. At the same time, the elastic collar may constitute the circumferential seal for the shaft and the seat for the spring on the end face of the slide ring so that the cover disc used in prior art structures may be dispensed with. Thus, the slide ring seal is formed only of three components and is simpler and more economical to manufacture.

By virtue of further features of the invention, the radial pressing of the spring turns on the shaft and/or the circumferential surface of the slide ring is improved with the interposition of the elastic collar even in case of increased deviations of the spring diameter from that of the shaft or the slide ring. An optimal torque take-up is thus ensured, and the spring may be manufactured in a simpler manner with larger tolerances. The spring turns which surround the slide ring simultaneously constitute a protective housing therefor.

It has been found to be practical to provide that normally the elastic collar does not, in the zone of the static seal, sealingly engage the shaft upon installation. In such situations, the bellows portion of the elastic collar is so designed that the sealing bellows, by virtue of external pressure, particularly during very high loads, is pressed onto the shaft and has there a sealing effect and is protected from damages by the backup support provided by the shaft surface. Further, a backup disc preferably made of metal or deformation-resistant synthetic material may also be provided to prevent a pressing of the elastomer material into the annular gap defined between the shaft and the slide ring.

DESCRIPTION OF THE PREFERRED EMBODIMENTS

Figure 1:
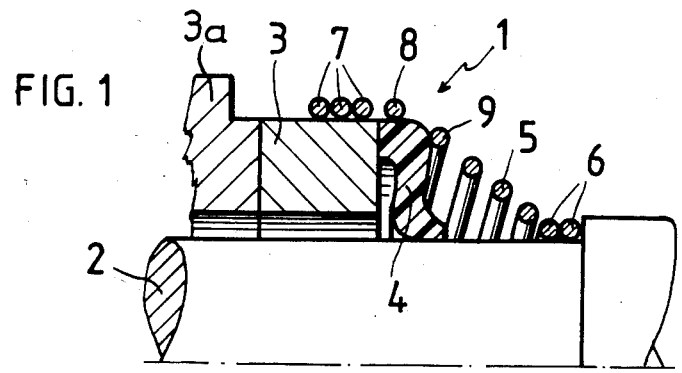
FIGS. 1, 2 and 3 are axial sectional views of three preferred embodiments of the invention.

Turning now to FIG. 1, there is illustrated a slide ring seal assembly generally designated at 1 which is adapted for installation on a shaft 2 and which has a slide ring 3, an elastic collar 4 and a helical compression spring 5. The latter is frictionally connected with the shaft 2 with two terminal spring turns 6. The mutually contacting terminal spring turns 7 at the other end of the spring 5 are frictionally connected with the outer circumferential surface of the slide ring 3 and thus form a protective housing for the slide ring 3. The spring turn 8 presses the elastic collar 4 radially onto the shaft 2 and the spring turn 9 engages an outer radial part of the elastic collar 4 and thus, in the installed state, presses the slide ring 3, with the intermediary of the material of the collar 4, against a counter ring 3a. In this embodiment, the slide ring 3 has a rectangular cross section and is thus relatively easy to manufacture.

Figure 2:
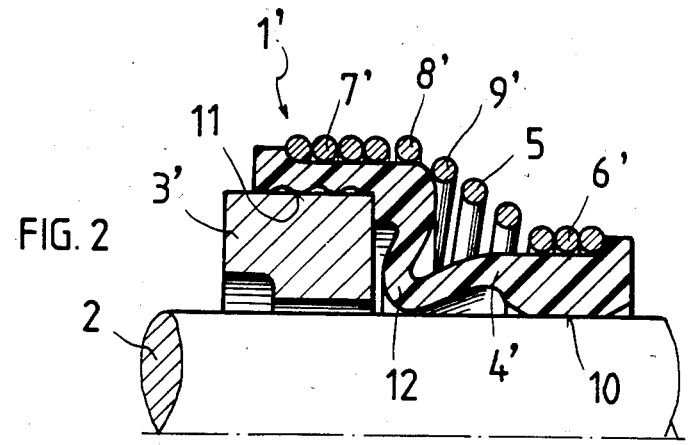

Turning now to the slide ring seal assembly 1' illustrated in FIG. 2, the elastic collar 4' thereof forms intermediate support faces 10, 11 for the outer spring turns 6' and 7' and transmits the radial pressing force of the spring to the shaft 2 and the slide ring 3'. Further, the spring turn 8' radially presses a bellows portion 12 of the elastic collar 4 onto the shaft 2 to form a static seal thereabout. The spring turn 9' engages an outer radial portion of the collar 4 for effecting an axial pressing force on the slide ring 3'.

Figure 3:
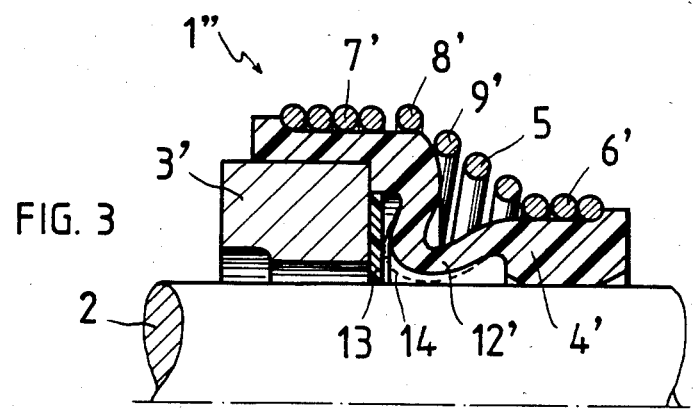

Turning now to the embodiment illustrated in FIG. 3, the sealing bellows 12' of the slide ring seal assembly generally designated at 1" is so designed that upon installation on the shaft 2 it does not contact the shaft 2 and is pressed sealingly onto the latter only during operation by means of an externally applied axial force to assume its position shown in phantom lines. Stated differently, the inner diameter of the bellows 12' is, in the relaxed state, slightly less than that of the collar portion pressed radially on the shaft 2 by the spring turns 6'. A relatively rigid support disc 13 provided between the slide ring 3' and the shaft 2 prevents the sealing bellows 12' from being pressed into the clearance between the slide ring 3' and the shaft 2.

It will be understood that the above description of the present invention is susceptible to various modifications, changes and adaptations, and the same are intended to be comprehended within the meaning and range of equivalents of the appended claims.

What is claimed is:

1. In a slide ring seal assembly for installation on a shaft of a machine to provide a seal between the shaft and other components of the machine, including an axially displaceable slide ring arranged for surrounding the shaft in an installed state of the assembly; an elastic collar arranged coaxially with said slide ring and arranged for surrounding and circumferentially engaging the shaft in the installed state of the assembly, said elastic collar being in engagement with the slide ring for providing a static seal between the slide ring and the shaft in the installed state of the assembly and a helical compression spring having opposite first and second ends and formed of a plurality of spring wire turns; said compression spring being arranged coaxially with the slide ring and the elastic collar; said compression spring being arranged for surrounding the shaft in the installed state of the assembly and for exerting a radial force on the shaft with at least one first turn at said first end; said second end being situated at said slide ring and being operatively connected therewith for axially urging the slide ring towards a counterring in the installed state of the assembly; the improvement wherein at least one second turn at said second end of said spring circumferentially surrounds said slide ring with a radially inward bias; said elastic collar having an outer radial face oriented towards said first end, further wherein at least one third turn, situated between the first and the second ends, axially adjoins said outer radial face and is arranged for axially pressing against said radial face to exert an axial force on said slide ring via said elastic collar in the installed state of the assembly and further wherein at least one fourth turn is in engagement with an outer circumferential face of said elastic collar in a zone of said static seal for pressing said elastic collar radially against the shaft in the installed state of the assembly.

2. A slide ring seal assembly as defined in claim 1, wherein said elastic collar has a terminal length portion having an inner face being in circumferential engagement with said slide ring and an outer face being surrounded and engaged by said at least one second turn.

3. A slide ring seal assembly as defined in claim 1, wherein said second turn is present in a mutually contacting plurality for forming a housing for said slide ring.

4. A slide ring seal assembly as defined in claim 1, wherein said elastic collar has a terminal length portion having an inner face and an outer face; said outer face of said terminal length portion being surrounded by said at least one first turn to frictionally press said inner face against said shaft in the installed state of said assembly.

5. A slide ring seal assembly as defined in claim 4, wherein said inner face of said terminal length portion has a first diameter; further wherein said elastic collar has a circumferential inner face portion situated between and axially spaced from, said slide ring and said terminal length portion; said circumferential inner face portion having a second diameter being, in a relaxed state, greater than said first diameter; said circumferential inner face portion being compressible radially onto said shaft by an external force in the installed state of the assembly.

6. A slide ring seal assembly as defined in claim 5, further comprising a rigid separator disc situated between and coaxially with said slide ring and said circumferential inner face portion of said elastic collar.

* * * * *